US012326028B2

(12) United States Patent
Evans et al.

(10) Patent No.: US 12,326,028 B2
(45) Date of Patent: Jun. 10, 2025

(54) GARAGE DOOR EMERGENCY VENTILATION SYSTEM

(71) Applicants: Leonard Evans, South Holland, IL (US); Paula Evans, South Holland, IL (US)

(72) Inventors: Leonard Evans, South Holland, IL (US); Paula Evans, South Holland, IL (US)

( * ) Notice: Subject to any disclaimer, the term of this patent is extended or adjusted under 35 U.S.C. 154(b) by 406 days.

(21) Appl. No.: 17/854,033

(22) Filed: Jun. 30, 2022

(65) Prior Publication Data

US 2023/0132122 A1 Apr. 27, 2023

Related U.S. Application Data

(60) Provisional application No. 63/272,291, filed on Oct. 27, 2021.

(51) Int. Cl.
*E05F 15/72* (2015.01)

(52) U.S. Cl.
CPC ......... *E05F 15/72* (2015.01); *E05Y 2201/422* (2013.01); *E05Y 2201/43* (2013.01); *E05Y 2800/40* (2013.01); *E05Y 2900/106* (2013.01)

(58) Field of Classification Search
CPC ........... E05Y 2201/422; E05Y 2201/43; E05Y 2800/40; E05Y 2900/106; E04H 6/02; E04H 6/42
USPC .......................................................... 454/195
See application file for complete search history.

(56) References Cited

U.S. PATENT DOCUMENTS

| | | | | | |
|---|---|---|---|---|---|
| 4,827,667 | A * | 5/1989 | Jarvis | E05F 15/668 | 49/200 |
| 5,848,630 | A * | 12/1998 | Manzo | E06B 5/10 | 160/113 |
| 6,092,580 | A * | 7/2000 | Lucas | E06B 3/485 | 160/113 |
| 7,086,442 | B1 * | 8/2006 | Esparza | E06B 9/52 | 160/113 |
| 9,957,753 | B2 * | 5/2018 | Amsellem | E06B 9/52 | |
| 2003/0070769 | A1 * | 4/2003 | Lampers | E06B 7/02 | 160/113 |
| 2006/0124252 | A1 * | 6/2006 | Miller | E01F 13/04 | 160/113 |

(Continued)

*Primary Examiner* — Avinash A Savani
*Assistant Examiner* — Ryan L Faulkner
(74) *Attorney, Agent, or Firm* — Brennan, Manna & Diamond, LLC

(57) ABSTRACT

The present invention relates to a garage door emergency ventilation system primarily comprised of at least one track, at least one screen assembly, and at least one control module. The system can be attached to a panel of a garage door, wherein the control module has at least one sensor that preferably detects carbon monoxide. Once the sensor has detected carbon monoxide above a threshold value, the control module communicates with a motor to retract a fastener from an inner track within the track that is attached to the screen assembly. At the same time, the control module communicates with a garage door opener of the garage door to open the garage door. The screen assembly falls downward to cover the opening left by the opened garage door. The screen assembly further prevents individuals from getting into the garage while allowing carbon monoxide gas to vent from the garage.

14 Claims, 2 Drawing Sheets

(56) References Cited

U.S. PATENT DOCUMENTS

| | | | | |
|---|---|---|---|---|
| 2018/0266172 | A1* | 9/2018 | Wray | E05F 17/004 |
| 2023/0323717 | A1* | 10/2023 | Ion | E05F 15/686 |

* cited by examiner

GARAGE DOOR EMERGENCY VENTILATION SYSTEM

CROSS-REFERENCE TO RELATED APPLICATION

The present application claims priority to, and the benefit of, U.S. Provisional Application No. 63/272,291 which was filed on Oct. 27, 2021, and is incorporated herein by reference in its entirety.

FIELD OF THE INVENTION

The present invention relates generally to the field of garage doors. More specifically, the present invention relates to a garage door emergency ventilation system primarily comprised of at least one track, at least one screen assembly, and at least one control module. The system can be attached to a panel of a garage door, wherein the control module has at least one sensor that preferably detects carbon monoxide. Once the sensor has detected carbon monoxide above a threshold value, the control module communicates with a motor to retract a fastener from an inner track within the track that is attached to the screen assembly. At the same time, the control module communicates with a garage door opener of the garage door to open the garage door. While this occurs, the screen assembly falls downwards to cover the opening left by the opened garage door. The screen assembly further prevents animals or individuals from getting into the garage while allowing carbon monoxide gas to vent from the garage. Accordingly, the present disclosure makes specific reference thereto. Nonetheless, it is to be appreciated that aspects of the present invention are also equally applicable to other like applications, devices and methods of manufacture.

BACKGROUND

At least 430 people in the United States die every year from carbon monoxide poisoning. Further, according to the Centers for Disease Control and Prevention, about 50,000 people are sent to the hospital each year with carbon monoxide poisoning. Unintentional carbon monoxide poisoning can easily occur if a vehicle is left running inside a closed garage, or if there is a carbon monoxide leak within a garage.

Therefore, there exists a long-felt need in the art for a carbon monoxide detecting device. Further, there exists a long-felt need in the art for a garage door emergency ventilation system that can be used to ventilate a garage that has a carbon monoxide leak. Further, there exists a long-felt need in the art for a garage door emergency ventilation system that can be used to ventilate a garage with a carbon monoxide leak, wherein the system functions automatically and without user input.

The subject matter disclosed and claimed herein, in one embodiment thereof, comprises a garage door emergency ventilation system. The system is primarily comprised of at least one track, at least one screen assembly, and at least one control module. The system can be attached to a panel of a garage door. The control module has at least one sensor that preferably detects carbon monoxide. Once the sensor has detected carbon monoxide above a threshold value, the control module communicates with a motor to retract a fastener from an inner track within the track that is attached to the screen assembly. Simultaneously, the control module communicates with a garage door opener of the garage door to open the garage door. As this occurs, the screen assembly falls downwards to cover the opening left by the opened garage door. The screen assembly further prevents animals or individuals from getting into the garage while allowing carbon monoxide gas to vent from the garage.

In this manner, the garage door emergency ventilation system of the present invention accomplishes all of the foregoing objectives and provides a carbon monoxide detecting device in the form of a garage door emergency ventilation system. Furthermore, the system can be used to ventilate a garage with a carbon monoxide leak. In addition, the system functions automatically and without user input.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a garage door emergency ventilation system. The system is primarily comprised of at least one track, at least one screen assembly, and at least one control module. The track is preferably vertical in orientation with two mounting brackets which are perpendicularly attached to each end of the track to allow the track to attach to the rear surface of a panel of a garage door. The track is further comprised of at least one vertical inner track that can move vertically within the track. At least one screen assembly is attached to the inner track that is further comprised of a frame that surrounds a metal or mesh screen.

The system is further comprised of at least one control module further comprised of at least one sensor. In the preferred embodiment, the sensor can detect carbon monoxide gas in the surrounding area of the garage door. Once a threshold value of carbon monoxide has been exceeded, at least one LED light located on the module will illuminate red. If the value has not been exceeded, the light will remain green. In this manner, nearby individuals will be visually notified of the presence of carbon monoxide gas above normal concentrations in the surrounding area.

The module further has at least one processor and at least one transmitter, wherein once the sensor detects a carbon monoxide value above the threshold value, the sensor communicates with the processor and transmitter which signals the existing garage door opener to begin opening the garage door for a predetermined amount of time. The distance of the opening created by the door lifting and the garage floor is preferably the overall height of the screen assembly.

At least one release fastener is preferably attached to the inner track. The fastener can be retracted by a motor, such that the inner track can move downward vertically. As a result, the screen assembly attached to the inner track will fall downward to cover the opening that has been created by the partial opening of the garage door. Therefore, ventilation of any harmful carbon monoxide will occur. In addition, the screen further prevents any individuals or animals from being able to enter the garage.

Accordingly, the garage door emergency ventilation system of the present invention is particularly advantageous as it provides a carbon monoxide detecting device in the form of a garage door emergency ventilation system. The system can be used to ventilate a garage with a carbon monoxide leak, wherein the system functions automatically and without user input. In this manner, the garage door emergency ventilation system provides a novel solution to prevent carbon monoxide leaks within garages from becoming deadly.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
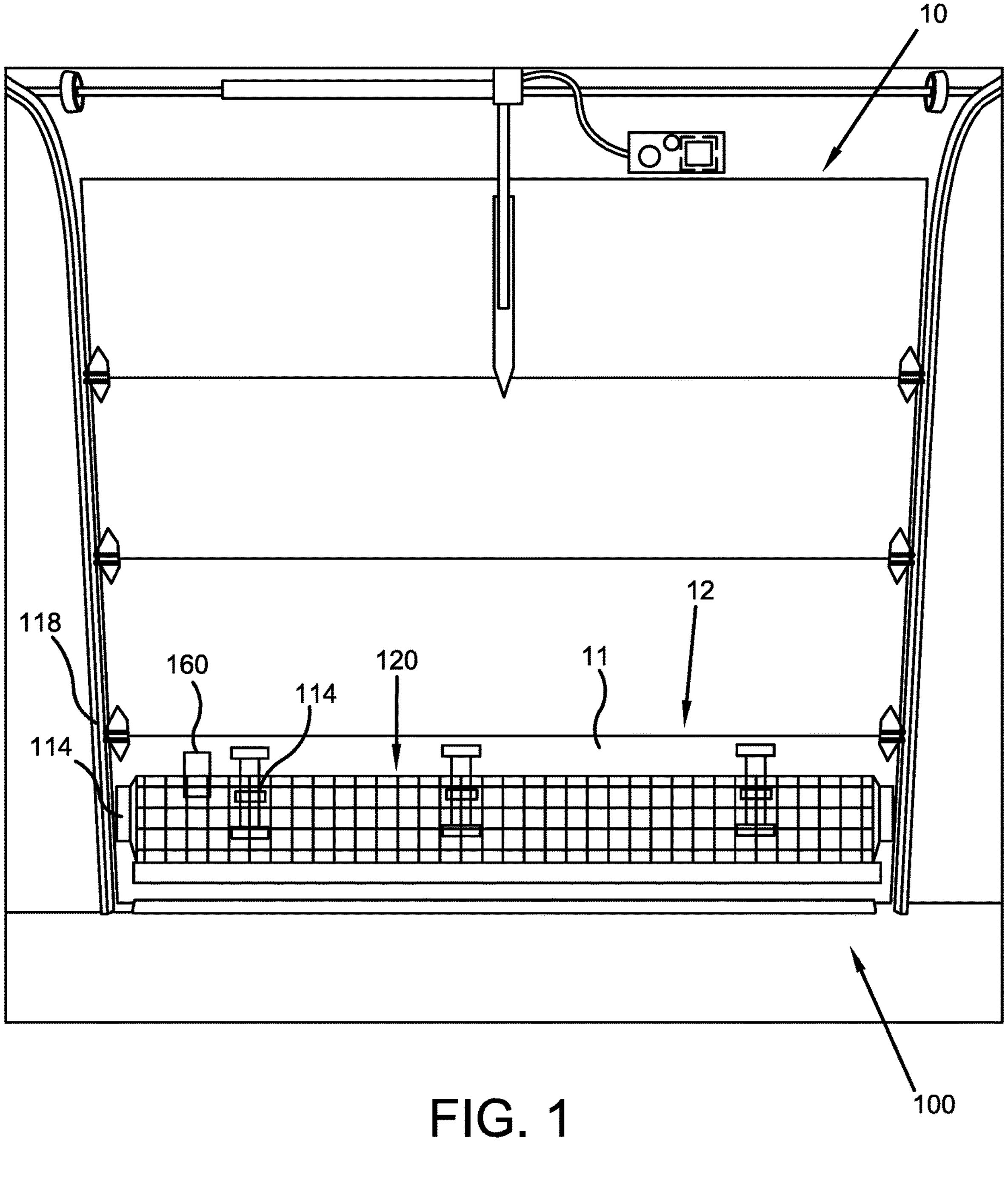
FIG. 1 illustrates a perspective view of one potential embodiment of a garage door emergency ventilation system of the present invention while attached to a closed garage door and in an undeployed position in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a carbon monoxide detecting device. Further, there exists a long-felt need in the art for a garage door emergency ventilation system that can be used to ventilate a garage with a carbon monoxide leak. Further, there exists a long-felt need in the art for a garage door emergency ventilation system that can be used to ventilate a garage with a carbon monoxide leak, wherein the system functions automatically and without user input.

The present invention, in one exemplary embodiment, is comprised of a garage door emergency ventilation system primarily comprised of at least one track, at least one screen assembly, and at least one control module. The track is preferably vertical in orientation with two mounting brackets which are perpendicularly attached to each end of the track to allow the track to attach to the rear surface of a panel of a garage door. The track is further comprised of at least one vertical inner track that can move vertically within the track, wherein at least one screen assembly is attached to the inner track with a frame that surrounds a metal or mesh screen.

At least one control module is further comprised of at least one sensor that can detect carbon monoxide gas in the surrounding area of the garage door. Once a threshold value has been exceeded, at least one LED light located on the module will illuminate red. If the value has not been exceeded, the light will remain green. In this manner, nearby individuals will be visually notified of the presence of carbon monoxide gas above normal concentrations in the surrounding area.

The module further has at least one processor and at least one transmitter. Once the sensor detects a carbon monoxide value above the threshold value, the sensor communicates with the processor and transmitter which signals the existing garage door opener to begin opening the garage door for a predetermined amount of time. The distance of the opening created by the door lifting and the garage floor is preferably the overall height of the screen assembly.

At least one release fastener is preferably attached to the inner track. The fastener can be retracted by a motor, such that the inner track can move downward vertically. As a result, the screen assembly attached to the inner track will fall downward to cover the opening that has been created by the partial opening of the garage door. Therefore, ventilation of any harmful carbon monoxide will occur. In addition, the screen further prevents any individuals or animals from being able to enter the garage.

Accordingly, the garage door emergency ventilation system of the present invention is particularly advantageous as it provides a carbon monoxide detecting device in the form of a garage door emergency ventilation system. The system can be used to ventilate a garage with a carbon monoxide leak, wherein the system functions automatically and without user input. In this manner, the garage door emergency ventilation system provides a novel solution to prevent carbon monoxide leaks within garages from becoming deadly.

Referring initially to the drawings, FIG. 1 illustrates a perspective view of one potential embodiment of a garage door emergency ventilation system 100 of the present invention while attached to a closed garage door 10 and in an undeployed position in accordance with the disclosed architecture. The system 100 is primarily comprised of at least one track 110, at least one screen assembly 120, and at least one control module 150. Unless otherwise noted herein, all components of the system 100 are preferably manufactured from a durable metal material such as, but not limited to: stainless steel, aluminum, etc. The system 100 is comprised of at least one track 110 that is preferably vertical in orientation. The track 110 may be generally I-shaped with two mounting brackets 116 which are perpendicularly attached to each end of the track 110. The mounting brackets 116 further receive at least one mounting fastener 118 such as, but not limited to: a screw, a nail, a bolt, a magnet, etc., that allows the track 110 to attach to the rear surface 11 of a panel 12 of a garage door 10. It should be appreciated that all components of the system 100, excluding the control module 150, are located on the bottom-most panel 12 (i.e., the panel 12 closet to the garage floor 16) of any style of garage door 10. In this manner, the system 100 does not inhibit the function of the garage door 10 when the door 10 is raised and lowered during normal use of the door 10.

The track 110 is further comprised of at least one vertical inner track 112. The inner track 112 can move vertically upwards and downwards within the track 110. At least one screen assembly 120 is fixedly or removably attached to the inner track 112 using at least one mounting fastener 118 such as, but not limited to: a screw, a nail, a bolt, a magnet, etc. The screen assembly 120 is generally rectangular or generally square and is further comprised of a rigid frame 122. The frame 122 surrounds a metal or mesh screen 124. In differing embodiments, the screen 124 may be of any spacing known in the art. The bottom edge 1220 of the frame 122 is further comprised of a rubber gasket 126 which seals the bottom edge 1220 against the garage floor 16.

The system 100 is further comprised of at least one control module 150. The module 150 is preferably positioned above or near a garage door 10 that the system 100 is installed on and used with. The module 150 is comprised of a power cord 152 that can be plugged into any nearby 110V/240V outlet to supply power to the module 150. The module 150 is further comprised of at least one sensor 156. In the preferred embodiment, the sensor 156 can detect carbon monoxide gas in the surrounding area of the garage door 10. However, in other embodiments the sensor 156 may also detect other poisonous gases of the like. The sensor 156 preferably has a threshold value of at least 30 parts per million of carbon monoxide in the surrounding air. Once said threshold value has been exceeded, at least one LED light 158 located on the module 150 will illuminate red. If the value has not been exceeded, the light 158 will remain green. In this manner, nearby individuals will be visually notified of the presence of carbon monoxide gas above normal concentrations (i.e., the threshold value) in the surrounding area.

The module 150 further has at least one processor 154 and at least one transmitter 155. Once the sensor 156 detects a carbon monoxide value above the threshold value, the sensor 156 communicates with the processor 154. The processor 154 then communicates with a transmitter 155, which is preferably in wireless electrical communication via Bluetooth, RFID, Wi-Fi, Radio Frequency, etc., with the existing garage door opener 20 of the garage door 10. The transmitter 155 then signals the garage door opener 20 to begin opening (raising) the garage door 10 for a predetermined amount of time, wherein the height of the opening 14 created by the door 10 lifting and the garage floor 16 is preferably the overall height of the screen assembly 120.

Figure 2:
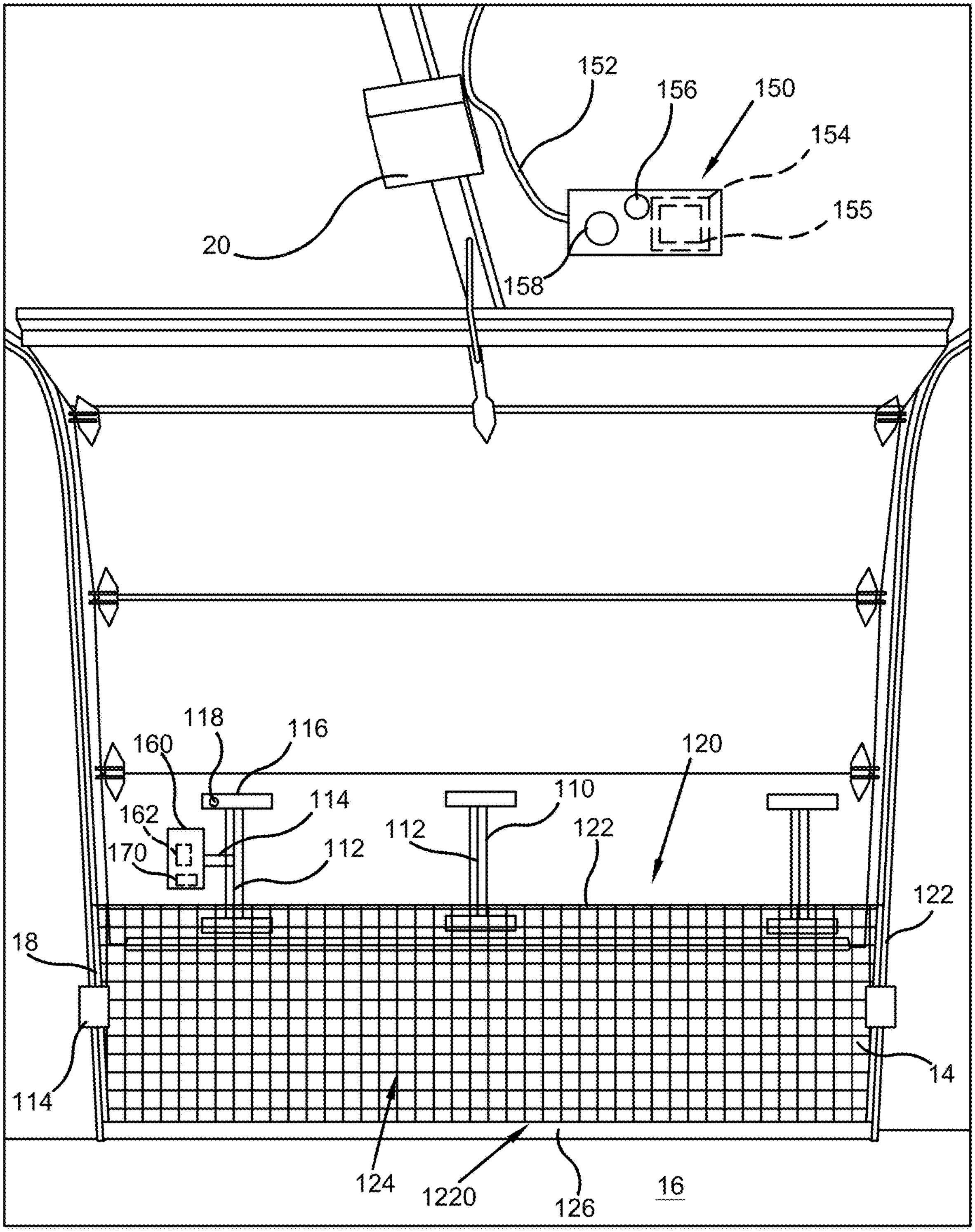
FIG. 2 illustrates a perspective view of one potential embodiment of a garage door emergency ventilation system of the present invention while attached to an open garage door and in a deployed position in accordance with the disclosed architecture.

At least one release fastener 114 is preferably attached to the inner track 112, such that when the fastener 114 is in the closed position the inner track 112 is immobile. In the preferred embodiment, the fastener 114 is a latch that can be extended and retracted to the inner track 112 by at least one motor 160. The motor 160 is preferably powered by a rechargeable or replaceable battery 170. The motor 160 is further comprised of at least one transmitter 162 that is in wireless electrical communication via Bluetooth, RFID, Wi-Fi, Radio Frequency, etc., with the transmitter 155 of the control module 150. In this manner, once the module 150 as communicated with the existing garage door opener 20 to partially open (raise) the garage door 10, the module 150 communicates with the transmitter 162 to retract the fastener 114 from the inner track 112 via the motor 160, such that the inner track 112 can move downward vertically. As a result, the screen assembly 120, which is attached to the inner track 112, will fall downward as the inner track 112 falls downward vertically within the track 110. Therefore, the screen assembly 120 covers the opening 14 that has been created by the partial opening of the garage door 10, as seen in FIG. 2. In this manner, ventilation of any harmful carbon monoxide can occur. However, the screen 124 further prevents any individuals or animals from being able to enter the garage. This feature is especially useful if the system 100 is activated in response to a carbon monoxide leak in a garage where no individuals are currently present. As a result, the area and any belongings inside the garage remain secure.

To further secure the screen assembly 120 during use, the frame 122 is further comprised of at least one fastener 114 that may be of the same type as the inner track 112. In this manner, once the fastener 114 of the inner track 112 has been released from the inner track 112 and the screen assembly 120 has moved downward to cover the garage door 10 opening 14, the transmitter 162 of the motor 160 of the fastener 114 located on the frame 122 extends the fastener 114 such that the fastener 114 contacts and is secured around at least one rail 18 of the garage door 10. In this manner, the screen assembly 120 cannot be pushed inwards or moved to allow entry into the garage when the system 100 has been deployed and the garage door 10 is open. In one embodiment, the fastener 114 may be a clamp-style fastener.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "garage door emergency ventilation system" and "system" are interchangeable and refer to the garage door emergency ventilation system 100 of the present invention.

Notwithstanding the foregoing, the garage door emergency ventilation system 100 of the present invention and its various components can be of any suitable size and configuration as is known in the art without affecting the overall concept of the invention, provided that they accomplish the above-stated objectives. One of ordinary skill in the art will appreciate that the size, configuration and material of the garage door emergency ventilation system 100 as shown in the FIGS. are for illustrative purposes only, and that many other sizes and shapes of the garage door emergency ventilation system 100 are well within the scope of the present disclosure. Although the dimensions of the garage door emergency ventilation system 100 are important design parameters for user convenience, the garage door emergency ventilation system 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A garage door emergency ventilation system comprising:

a track comprised of a vertical inner track;

a release fastener;

a motor;

a screen assembly; and a control module comprised of a sensor; and wherein the control module is in electrical communication with a transmitter of a garage door opener of a garage door; and wherein the control module signals the garage door opener to open the garage door via a transmitter of the control module when the sensor detects more than 30 parts per million of carbon monoxide.

2. The garage door emergency ventilation system of claim 1, wherein the garage door emergency ventilation system is sized and configured to attach to a garage door.

3. The garage door emergency ventilation system of claim 1, wherein the screen assembly covers an opening made by the garage door that has been opened.

4. A garage door emergency ventilation system comprising:

a track comprised of a vertical inner track;

a release fastener;

a motor;

a battery;

a screen assembly comprised of a frame and a screen; and a control module comprised of a transmitter and a sensor; and wherein the control module is in electrical communication with a transmitter of a garage door opener of a garage door; and wherein the control module signals the garage door opener to open the garage door via the transmitter of the control module when the sensor detects more than 30 parts per million of carbon monoxide.

5. The garage door emergency ventilation system of claim 4, wherein the screen assembly is attached to the vertical inner track.

6. The garage door emergency ventilation system of claim 5, wherein the release fastener engages the vertical inner track.

7. The garage door emergency ventilation system of claim 6, wherein the release fastener can be retracted from engaging the vertical inner track via the motor.

8. A garage door emergency ventilation system comprising:

a track comprised of a vertical inner track;

a release fastener;

a motor;

a battery;

a screen assembly attached to the vertical inner track, wherein the screen assembly is comprised of a frame, a screen and a gasket; and a control module further comprised of a transmitter, a sensor and an LED; and wherein the control module is in electrical communication with a transmitter of a garage door opener of a garage door;

wherein when the sensor detects a carbon monoxide value that exceeds a threshold value the control module signals the garage door opener to open the garage door via the transmitter of the control module; and wherein the threshold value is 30 parts per million of carbon monoxide.

9. The garage door emergency ventilation system of claim 8, wherein the LED illuminates in red when the threshold value is exceeded.

10. The garage door emergency ventilation system of claim 8, wherein the LED illuminates in green when the threshold value is not exceeded.

11. The garage door emergency ventilation system of claim 8, wherein the track is further comprised of a mounting bracket.

12. The garage door emergency ventilation system of claim 8, wherein the vertical inner track is vertically repositionable within the track.

13. The garage door emergency ventilation system of claim 8, wherein the release fastener can be retracted from engaging the vertical inner track via the motor.

14. The garage door emergency ventilation system of claim 13, wherein retracting the release fastener from the vertical inner track allows the screen assembly to fall downward.

* * * * *